United States Patent [19]

Grzesiak et al.

[11] Patent Number: 5,381,876
[45] Date of Patent: Jan. 17, 1995

[54] ANCHOR IN AUTOMATIC TRANSMISSION BANDS

[75] Inventors: Anthony J. Grzesiak, Sauk Village; Robert J. Fenoglio, Joliet; Douglas J. Slager, Oak Park, all of Ill.

[73] Assignee: Borg-Warner Automotive Transmission & Engine Components Corporation, Sterling Heights, Mich.

[21] Appl. No.: 164,106

[22] Filed: Dec. 8, 1993

Related U.S. Application Data

[63] Continuation-in-part of Ser. No. 962,766, Oct. 19, 1992, abandoned.

[51] Int. Cl.⁶ ............................................. F16D 65/06
[52] U.S. Cl. ............................ 188/250 H; 188/77 R
[58] Field of Search ............ 188/77 R, 77 W, 250 H, 188/249, 259

[56] References Cited

U.S. PATENT DOCUMENTS

| | | | |
|---|---|---|---|
| 1,590,104 | 6/1926 | Manning. | |
| 1,720,765 | 7/1929 | Smith. | |
| 1,759,934 | 5/1980 | Chanster. | |
| 3,367,466 | 2/1968 | Lang | 192/107 |
| 3,399,749 | 9/1968 | Baule | 188/259 |
| 3,732,954 | 5/1973 | Heid | 188/259 |
| 3,811,542 | 5/1974 | Hamrick | 188/259 |
| 3,893,225 | 7/1975 | Hamrick | 288/173 |
| 4,157,746 | 6/1979 | Body | 188/77 R |
| 4,159,049 | 6/1979 | Merz | 192/17 R |
| 4,456,100 | 6/1984 | Manaki | 188/77 R |
| 4,585,098 | 4/1986 | Pike | 188/251 A |
| 4,602,706 | 7/1986 | Blinks | 188/259 |
| 4,757,880 | 7/1988 | Grzesiak | 188/77 W |
| 4,787,483 | 11/1988 | Stefanutti | 188/77 W |
| 5,078,237 | 1/1992 | Grzesiak | 180/250 H |
| 5,083,642 | 1/1992 | Stefanutti et al. | 188/77 W |

Primary Examiner—Matthew C. Graham
Attorney, Agent, or Firm—Emch, Schaffer, Schaub et al.

[57] ABSTRACT

A transmission brake band (10) for use in automatic transmissions includes a strap member (12) with an apply bracket (18) located at one end and a reaction bracket (20) located at the opposed end. The reaction bracket (20) is formed from the strap material as an up-raised dome (36) surrounding the reaction opening (32). The surface of the dome (36) immediately surrounding the reaction opening (32) is substantially planar and perpendicular to a longitudinal axis defined by the reaction opening (32).

18 Claims, 7 Drawing Sheets

ANCHOR IN AUTOMATIC TRANSMISSION BANDS

RELATED APPLICATIONS

This application is a continuation-in-part of copending application Ser. No. 07/962,766, filed Oct. 19, 1992 now abandoned. The subject matter of the '766 application is hereby expressly incorporated herein in its entirety.

TECHNICAL FIELD

This invention disclosed herein relates to a transmission brake band utilized in a vehicle automatic transmission wherein the bands encompass one or more clutch drums and, under the influence of suitable hydraulic controls, effect gear changes and control the direction of rotation of the output or drive shaft from the transmission.

BACKGROUND OF THE INVENTION

In conventional vehicle automatic transmissions of the torque converter type, a driving shaft extends from the torque converter into the transmission housing to a unit having one or more clutch drums around which are arranged either single-wrap or double-wrap brake bands. It is the function of the brake band, through the application of suitable hydraulic controls, to effect gear changes and control the direction of rotation of the output shaft from the transmission to the differential for the driving wheels of the vehicle.

The present invention is an improvement in the anchor or reaction bracket of a transmission brake band and will be described in an embodiment intended to be utilized with a single-wrap brake band. However, the embodiment so described in this patent application is intended to be illustrative and is not intended to be limiting upon the use of this invention with transmission brake bands of all designs and styles.

Single-wrap brake bands are currently available in two distinct styles. The most commonly known single-wrap brake band is usually formed from a strip of sheet steel or similar material, having at its ends brackets formed from separate forgings, castings or stampings. The brackets are suitably secured to the strap of material by spot welding or similar methods as shown in U.S. Pat. No. 3,732,954. More recently, a unitary single-wrap brake band has been designed which utilizes a single piece of material wherein the brackets are extruded or formed from double thicknesses of the base metal at the ends of the strap member. An example of a brake band of this type of structure is disclosed in U.S. application Ser. No. 546,161 a parent application to this application, now allowed as U.S. Pat. No. 5,078,237.

Regardless of how the brake band and bracket members are formed, it is a requisite that each brake band have an actuation or apply end for receiving an apply piston and a reaction or anchor end which operatively receives a reaction member located in the transmission. Various types of automatic transmissions utilize different types of reaction members. Some reaction members may be of the tangential type which comprise a stationary plunger or stop member acting against the anchor end of the brake band, while other reaction members may be the reaction pin type where the pin is positioned perpendicular to the clutch drum and strap member and extends into a reaction opening located in the anchor bracket of the brake band.

Where a reaction pin is used as the reaction member in the transmission band, a "volcano" type reaction bracket is commonly provided to engage the reaction pin. A typical volcano bracket consists of an extruded opening extending radially outwardly from the reaction bracket of the band. Alternatively, a bushing secured to the bracket may have a reaction opening formed therein to receive the free end of the reaction pin, thus providing the anchored end of the brake band during use of the band in the automatic transmission. The opposite or apply end of the band is provided with an apply bracket for engaging the end of the apply plunger in the transmission. The apply plunger is hydraulically controlled to urge the apply end of the band towards the anchor end and thereby tighten the brake band around the clutch drum, thus stopping the rotation of the drum or otherwise altering the rotation of the drum or other member to change the gear ratio or alter the direction of rotation of the output shaft. Due to the high repetitive forces encountered by operation of a transmission brake band, the close tolerances required for proper function between the free end of the reaction pin and the opening of the volcano are critical. Many problems have been encountered in which the volcano opening fails prematurely during testing or operation of transmission. For instance, if the reaction pin is not fully engaged with the volcano opening the open edges of the volcano may chip, splinter, and crack.

U.S. Pat. No. 5,078,237 approaches the stress failure problems of such volcano brackets by providing a single piece brake band with an anchor embossment extruded from a double thickness of the strap material to produce a volcano type reaction bracket at one end of the brake band. The strap material is folded upon itself to form the double-layer and the volcano opening is formed by piercing the double layer of material to extrude the layers and form a tapered opening. The two layers of strap material are then secured together by clinch fastening, spot welding or other adequate means.

While the extruded volcano opening has provided for enhanced strength characteristics and has significantly reduced the number of stress failures in such volcano anchor brackets, it remains desirable to further reduce the risk of failure of volcano reaction openings. Problems with stress fractures and failure are still encountered, especially in situations where the reaction pin is not fully inserted through the volcano opening and forces are exerted at the upraised edges of the volcano opening.

Another structure designed to overcome the deficiencies of the volcano-type reaction openings is found in Canadian Patent No. 1,248,884 issued to one of the co-inventors herein. The Canadian '884 patent discloses an anchor bracket which is provided with a circular opening adapted to receive a reaction pin that is located generally perpendicular to the band. The reaction pin engages the forward edge of a pocket which is formed in a transverse ridge of the anchor bracket. The rearward edge of the pocket, however, provides little possibility of engagement with the reaction pin, due to the nonplanar shape of the ridge. Thus, the reaction opening found in the Canadian patent is deficient if the brake band must be designed to support a load in any direction other than the forward direction. The Canadian structure remains sensitive to the depth of the location of the reaction pin if loads are applied in any direction other than forward.

Yet another anchor structure is found in U.S. Pat. No. 5,083,642 which discloses a separate anchor bracket having an upraised channel-like surface surrounding the reaction opening. The anchor bracket is secured to the strap by conventional means such as spot welding or riveting along the sides of the bracket and band. Such a structure however has developed a tendency to flatten out or stretch under a load taken in the direction of the unsecured edges of the bracket. Thus, a need is still present for an anchor member which can receive an anchor or reaction pin and carry a load exerted in any direction without need for reinforcement to prevent distortion of the bracket.

It is yet another object of this invention to support a load applied to the brake band from any direction without the need for preloading the brake band which has the potential for interfering with band installation.

It is a further object of this invention to provide an anchor assembly for a transmission band wherein the reaction opening can be provided without overly stressing or distorting the surrounding material.

It is a final object of this invention to provide a reaction bracket having enhanced strength characteristics designed to overcome the possibility of premature failures of the brake band.

The present invention achieves these goals by increasing the strength of the bracket and reducing the stress on the reaction opening so that premature failure of the bracket is quantitatively lessened.

BRIEF DESCRIPTION OF THE INVENTION

The present invention provides an improved anchor bracket for use with automatic transmission brake bands. The bracket includes a prestressed dome portion surrounding the reaction opening which is formed by punching or piercing the bracket material. The bracket of the present invention is herein described generally with regard to its incorporation with a single piece brake band, however, it is envisioned that the dome bracket of this invention may be utilized with any brake band design where it may be formed integrally from the band material. For the purposes of simplicity, the present invention will be described as used with a single strip of suitable metallic band material wherein the bracket portion is integrally formed therefrom.

In preparations for forming the brake band incorporating the domed bracket of the present invention, a single strap of suitable metallic band material is provided. Both ends of the strap are bent upwardly and rearwardly over onto the strap member to form a double thickness of material at the ends of the strap. This area of double thickness is utilized to form the apply bracket at one end and the reaction bracket at the opposed end. Once the strap material has been folded upon itself, the double layer of material at the reaction end is expanded and prestressed to create a dome configuration. The expansion operation prestresses the material surrounding the reaction opening in a symmetrical manner, thereby providing enhanced strength characteristics to the dome anchor. The dome is at the same time pierced or punched to produce the reaction opening in the bracket. There is no extrusion of the layers of the strap material. Rather, the perimeter surface area surrounding the reaction opening after the punching step is generally aligned in parallel with the curvilinear surface of the remainder of the band. The dome portion surrounding the reaction opening places the strap material in a generally perpendicular relationship to the reaction pin as it is inserted in the reaction opening. The two layers of material forming the bracket are secured together by commonly known methods such as clinch fastening or spot welding. The apply bracket for the band is further provided by any known method which allows for the end of the apply piston to engage and act to tighten the band around the clutch drum to apply the transmission band to the drum.

The invention will be more readily understood after reading the following best mode for carrying out the invention with reference to the accompanying drawings.

BEST MODE FOR CARRYING OUT THE INVENTION

Referring now with particularity to the drawings, the present invention will be described in detail as a one-piece single-wrap brake band. However, it is not intended that this description of the invention in use with a single-wrap one-piece brake band be necessarily limiting upon the envisioned range of embodiments for the present invention.

Figure 1:
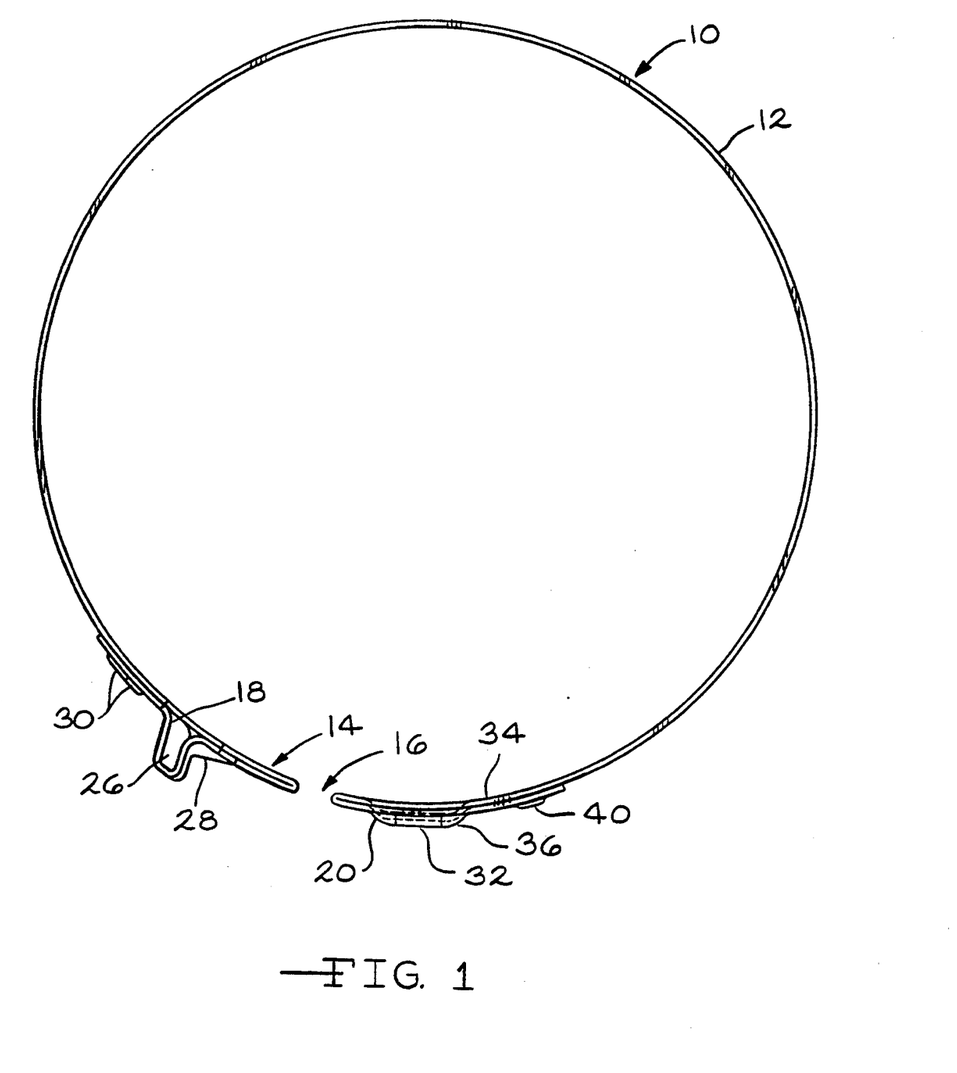
FIG. 1 is an elevated side view of the transmission brake band of the present invention.
Figure 2:
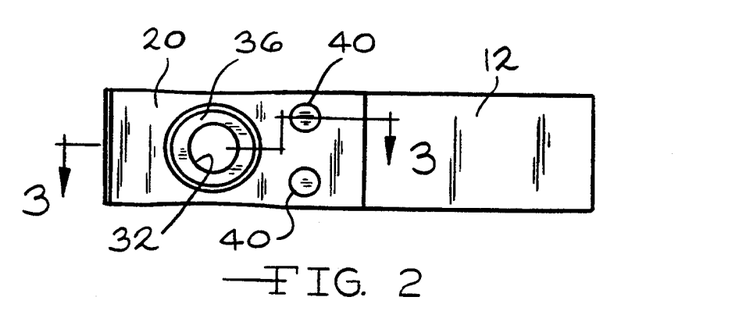
FIG. 2 is a partial top plan view of the reaction bracket for the transmission brake band of FIG. 1.
Figure 3:
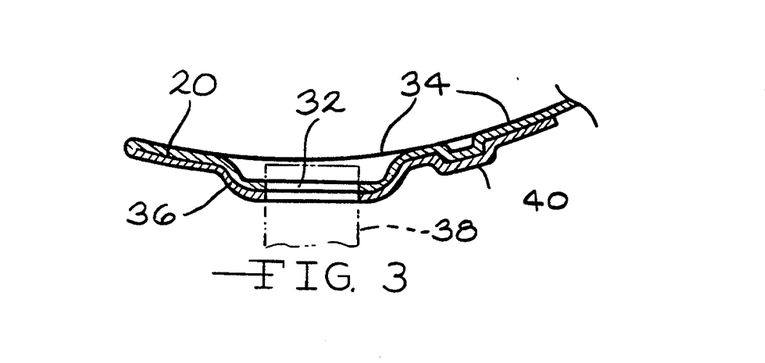
FIG. 3 is a sectional view taken along lines 3—3 of FIG. 2.

Referring now to FIGS. 1-3, a first embodiment of the present invention discloses a one-piece brake band, generally designed by the reference numeral 10 which is formed from an elongated strap of material 12 defining a curved band 12 of determinate length. The opposed ends 14, 16 of the strap 12 are folded over and rearwardly back upon the strap 12 to create bracket members 18, 20, designed to engage an apply piston (not shown) and a reaction pin 22, respectively. The brake band 10 further includes a friction lining 24 suitably secured thereto by any acceptable method of adhesion.

The apply bracket member 18 may be formed in any acceptable manner. The apply bracket shown in FIG. 1 is formed by folding the end 14 into an upwardly folded ridge 26 having a strengthening rib 28 on the side of the fold located below the contact point for an apply piston or pin. The folded ridge 26 may or may not include a depressed area (not shown) intended to form a pocket in the central area of the side opposite the strengthening rib 28. The depressed area is adapted to engage the end of the apply piston acting in a generally tangential direction to the clutch drum. The end 14 with ridge 26 and strengthening rib 28 are folded over the strap 12 and secured to the strap, preferably in a simultaneous manufacturing step with the folding and forming operation, by commonly accepted methods such as clinch fastening 30.

Referring now to FIGS. 2 and 3, the present invention resides in the end 16 which forms the bracket reaction member 20. The end 16 is formed by folding the strap member 12 upwardly and rearwardly upon itself. The double layer of material is then subjected to an expansion and piercing operation which forms the dome 36 and creates the reaction opening 32. The surface area of the dome 36 surrounding the opening 32 is symmetrically oriented to be substantially perpendicular to the axial centerline formed by the reaction opening 32 and is prestressed by the expansion operation. Thus, the reaction pin, shown in ghost as 38, engages both layers of the strap material formed in the dome 36 at the reaction opening 32 and the edge of the reaction opening 32 lies in a single planar orientation without distortion such as that caused by the extrusion processes utilized to create volcano openings. Further the integral formation of the dome 36 from the double layer of strap material creates an anchor bracket of enhanced performance and strength characteristics. Therefore, the full strength of the double layer of strap material 12 anchors the brake band 10 against movement induced by the apply pin against the apply bracket member 18. The surface 37 of the dome 36 immediately proximate the reaction opening 32 is symmetrically planar about the reaction opening 32 and is preferably aligned in a generally parallel relationship with the curvilinear surface of the strap member 12. Thus, the layers of strap material that act to engage the anchor pin 38 lie generally perpendicular to the axis of the anchor pin 38 and, therefore, provide for enhanced bracket 20 strength and less potential for deterioration as a result of the forces applied by the pin 38 to the reaction opening 32. The reaction bracket member 20 is fastened to the strap 12 by clinched fasteners 40 which are similar to the fasteners 30 utilized with the apply bracket. Although clinched fasteners are shown, the layers could also be spot welded or brazed together if desired.

Figure 4:
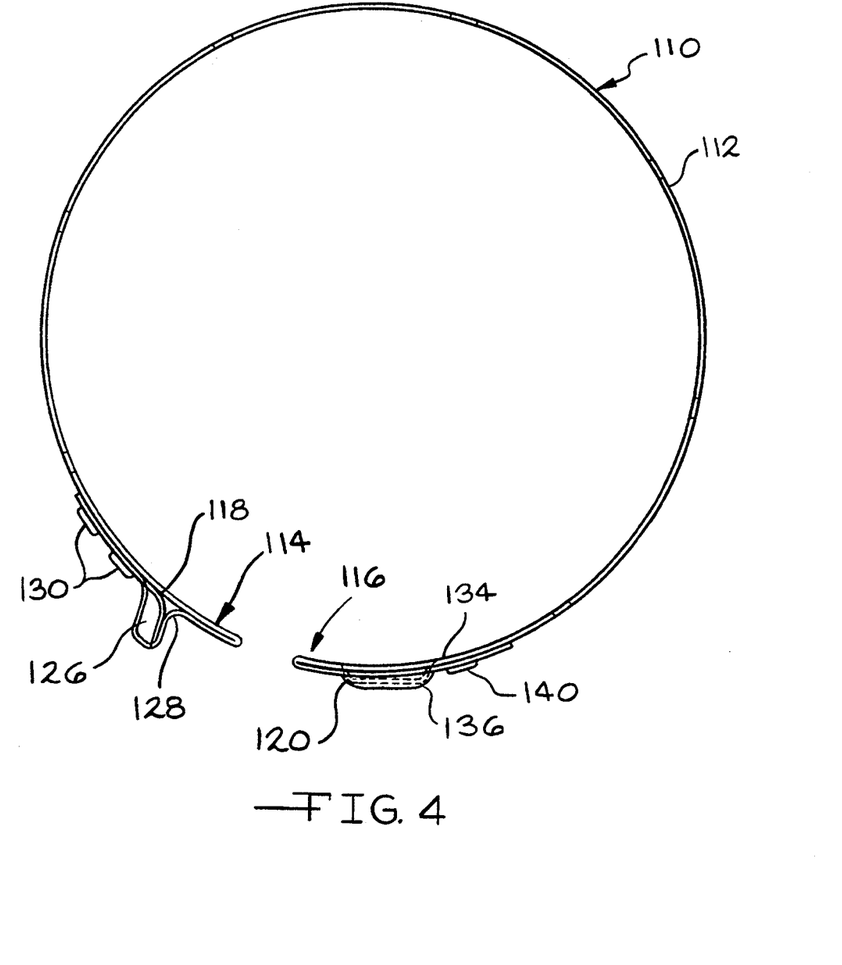
FIG. 4 is an elevational side view of a first alternative embodiment of the transmission brake band of the present invention.
Figure 5:
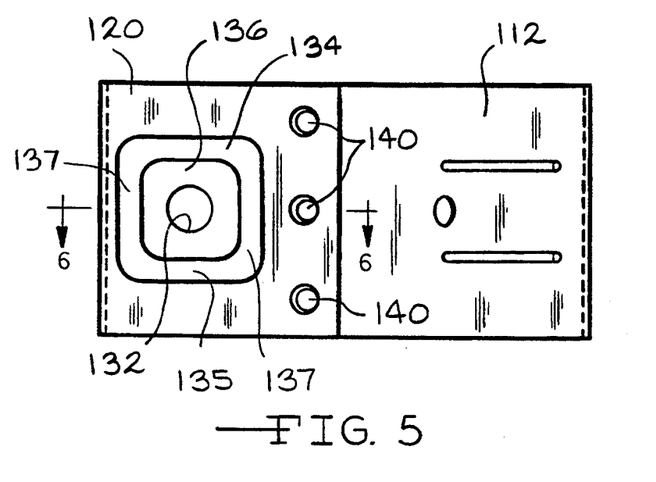
FIG. 5 is a top plan view of the reaction bracket of the transmission brake band of FIG. 4.
Figure 6:
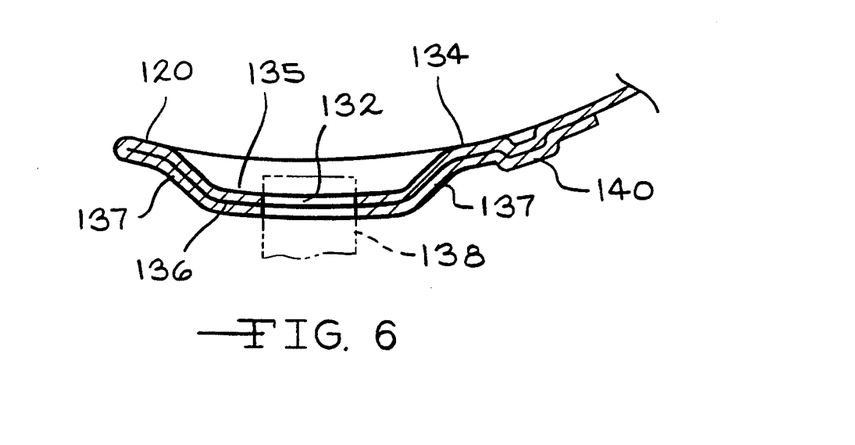
FIG. 6 is a sectional view taken along lines 6—6 of FIG. 5.

Referring now to FIGS. 4–6, an alternative embodiment of the present invention discloses a one-piece brake band, generally designated by the reference numeral 110 which is formed from an elongated strap of material defining a curved band 112 of determinate length. The opposed ends 114, 116 of the strap 112 are folded over and rearwardly back upon the strap 112 to create bracket members 18, 120, designed to engage an apply piston (not shown) and a reaction pin 122, respectively. The brake band 110 further includes a friction lining 124 suitably secured thereto by any acceptable method of adhesion.

The apply bracket member 118 may be formed in any acceptable manner. The apply bracket shown in FIG. 4 is formed by folding the end 114 into an upwardly folded ridge 126 having a strengthening rib 128 on the side of the fold located below the contact point for an apply piston or pin. The folded ridge 126 may or may not include a depressed area (not shown) intended to form a pocket in the central area of the side opposite the strengthening rib 128. The depressed area is adapted to engaged the end of the apply piston acting in a generally tangential direction to the clutch drum. The end 114 with ridge 126 and strengthening rib 128 are folded over the strap 112 and secured to the strap, preferably in a simultaneous manufacturing step with the folding and forming operation, by commonly accepted methods such as clinch fastening 130.

Referring now the FIGS. 5 and 6, a first alternative embodiment of the reaction bracket member 120 is shown. The bracket member 120 is formed by folding the strap member 112 upwardly and rearwardly back upon itself. The double layer of strap material is then subjected to an expansion and piercing operation which forms a dome 136 having a square shape and creates a reaction opening 132. The dome 136 includes two sides 135 which extend generally parallel with the longitudinal axis of the strap 112 and two sides 137 extending transverse to the longitudinal axis of the strap 112. The surface area of the dome 136 surrounding the opening 132 is symmetrically oriented to be substantially perpendicular to the axial centerline formed by the reaction opening 132 and is prestressed by the expansion operation. Thus, the reaction pin, shown in ghost as 138, engages both layers of the strap material formed in the dome 136 at the reaction opening 132 and the edge of the reaction opening 132 lies in a single planar orientation without distortion such as that caused by the extrusion processes used to create volcano-type openings. The expansion of the strap material and the integral formation of the dome 136 from the double layer of strap material creates an anchor bracket of enhanced performance and strength characteristics. The full strength of the double layer of strap material 112 anchors the brake band 110 against movement induced by the apply pin against the apply bracket member 118. The surface 137 of the dome 136 immediately proximate the reaction opening 132 is symmetrically planar about the reaction opening 132 and is preferably aligned in a generally parallel relationship with the curvilinear surface of the strap member 112. Thus, the layers of strap material that act to engage the anchor pin 138 lie generally perpendicular to the axis of the anchor pin 138 and, therefore, provide for enhanced bracket 120 strength and less potential for deterioration as a result of the forces applied by the reaction pin 138 to the reaction opening 132. The reaction bracket member 120 is fastened to the strap 112 by clinched fasteners 140 which are similar to the fasteners 130 utilized with the apply bracket, or any other common method of attachment.

Figure 7:
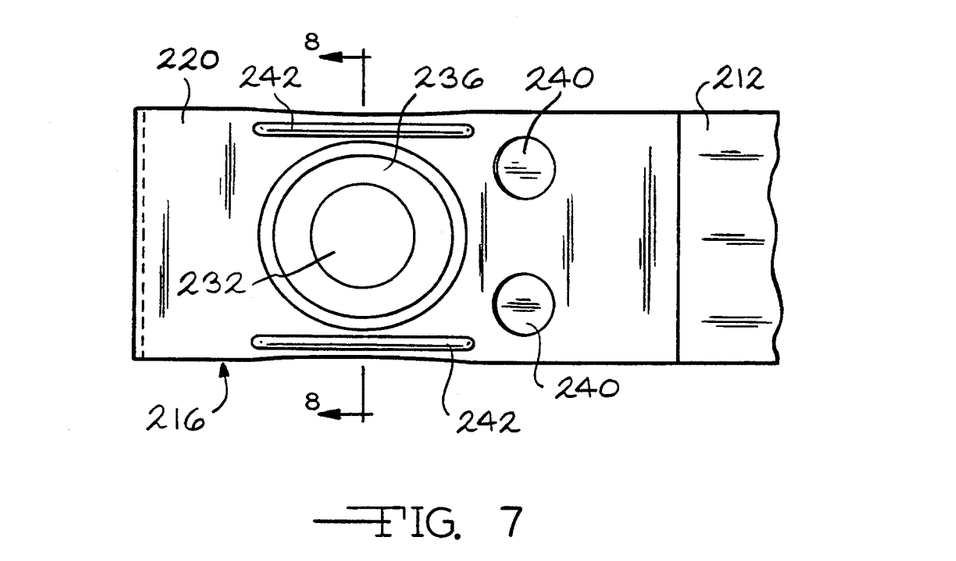
FIG. 7 is a top plan view of a second alternative embodiment of the transmission brake band of the present invention.
Figure 8:
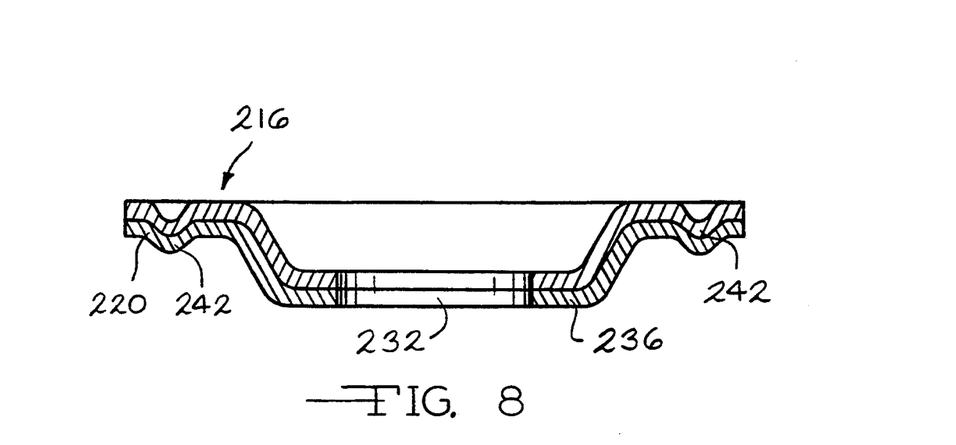
FIG. 8 is a sectional view taken along line 8—8 of FIG. 7.

Referring now to FIGS. 7 and 8, a second alternative embodiment of the reaction bracket member 220 is shown. The end 216 is initially formed by folding the strap member 212 upwardly and rearwardly back upon itself. The double layer of material is then subjected to an expansion and piercing operation which creates the reaction opening 232 and forms a dome 236 and a pair of crimped ridges 242 extending longitudinally and spaced between the dome 236 and the edges of the strap member 212. The surface area of the dome surrounding the reaction opening 232 is symmetrically oriented to be substantially perpendicular to the axial centerline formed by the reaction opening 232 and is prestressed by the expansion operation. Thus, as in the previously discussed embodiments, the reaction pin will engage both layers of the strap material formed in the dome 236 at the reaction opening 232 and the edge of the reaction opening 232 lies in a single planar orientation without distortion, creating greater bracket 220 strength and less potential for chipping and deterioration.

Viewing FIG. 2 and FIG. 7 carefully, it can be seen that the expansion formation of the dome 36, 236 creates a slight narrowing of the width of the strap member 12, 212 proximate the dome 36, 236. This slight narrowing in the width of the strap material 12, 212 tends to create an inherently weaker area in the bracket member, especially when the bracket member 20, 220 is subjected to stretching forces. The crimped ridges 242 are designed to strengthen the portion of the strap member 212 that is narrowed and potentially weakened, against the potentially damaging stretching forces.

The reaction member 220 shown in FIGS. 7 and 8 is fastened to the strap member 212 by clinched fasteners 240 such as those described earlier herein with regard to the first embodiment. Of course, other types of engagement such as brazing, welding and rivets can be utilized, if desired.

Referring now to FIGS. 9–13, a third alternative embodiment of the present invention discloses a one-piece brake band 310 which is formed from an elongated strap of material defining a curved band 312 of determinate length. The opposed ends 314, 316 of the strap 312 are folded over and rearwardly back upon the strap 312 to create bracket members 318, 320 designed to engage an apply piston (not shown) and a reaction pin (not shown). The finished brake band (310) further includes a friction lining (not shown) suitably received thereto by any acceptable method of adhesion.

Figure 13:
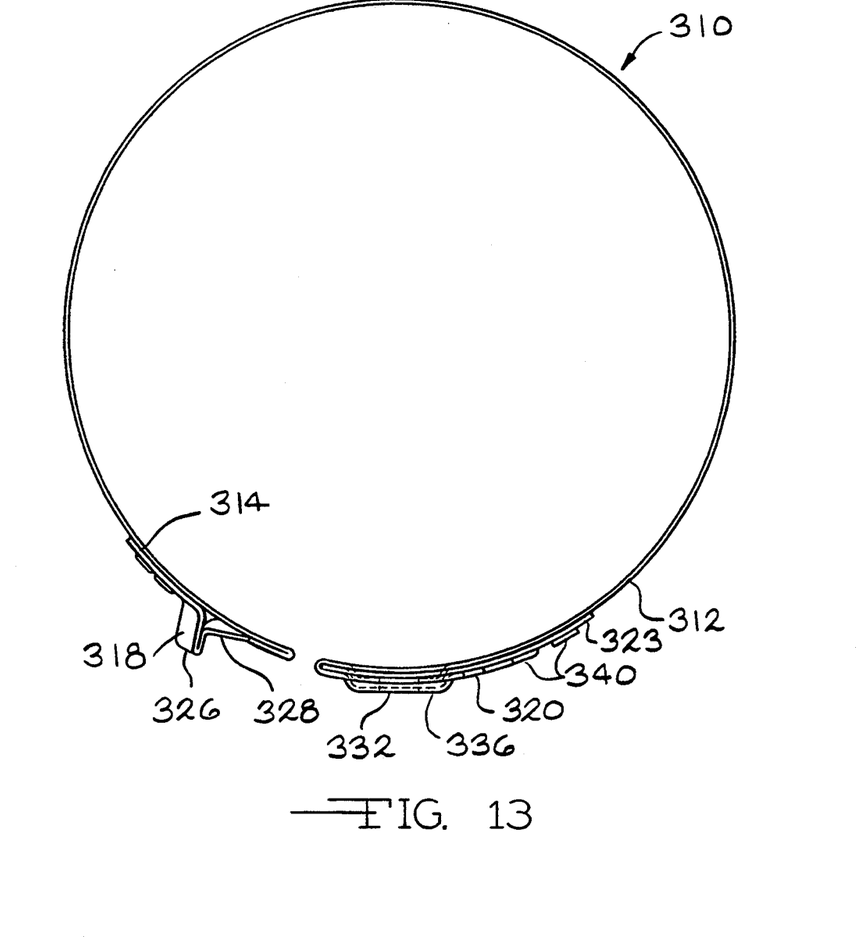
FIG. 13 is a partial side view of the transmission brake band of FIG. 11.

The apply bracket member 318, as shown in FIG. 13 is formed by folding the end 314 into an upwardly folded ridge 326 having a strengthening rib 328 on the side of the fold located below the contact point for the apply piston or pin. The folded ridge 326 may or may not include a depressed area (not shown) intended to form a pocket in the central area of the side opposite the strengthening rib 328. The depressed area is adapted to engage the end of the apply piston acting in a generally tangential direction to the clutch drum. The end 314 with ridge 326 and strengthening rib 328 is folded over the strap 312 and secured to the strap preferably in a simultaneous manufacturing step with the folding and forming operation.

Figure 9:
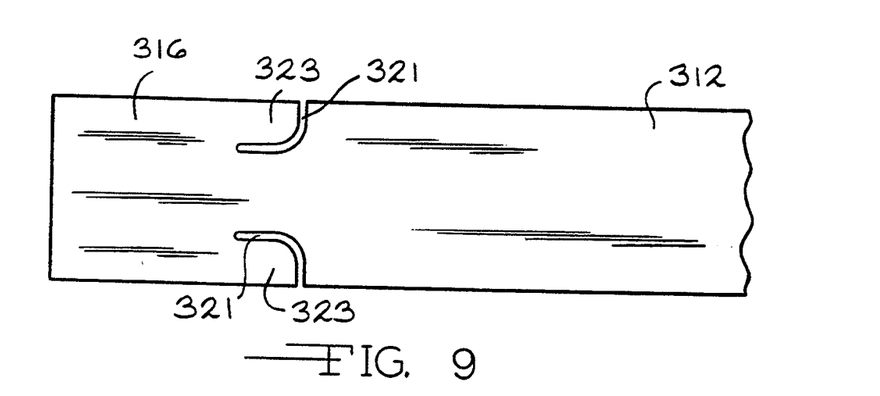
FIG. 9 is a top plan view of a transmission brake band prior to the forming process of a third alternative embodiment of the anchor member of the present invention.
Figure 10:
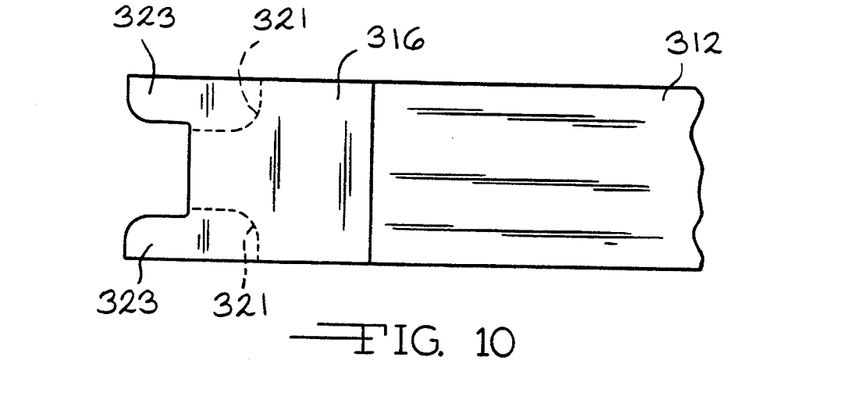
FIG. 10 is a top plan view of the transmission brake band of FIG. 9 showing the first fold process step for forming the anchor member.
Figure 11:
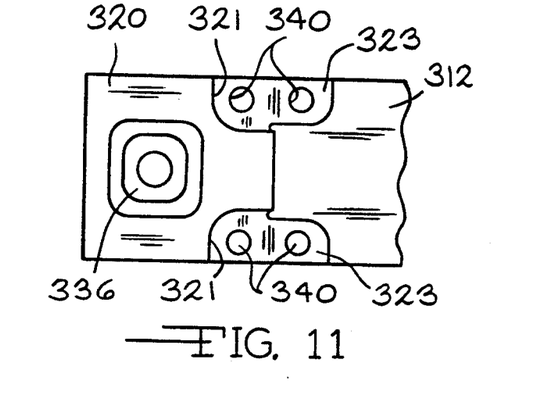
FIG. 11 is a top plan view of the complete third alternative embodiment of the reaction bracket of the transmission band of FIG. 9.
Figure 12:
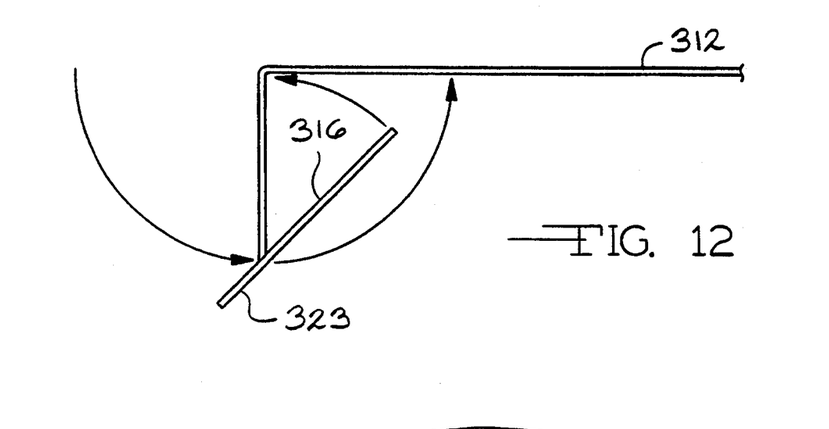
FIG. 12 is a side view illustrating the folding steps to form the transmission band of FIG. 11.

Referring now to FIGS. 9–12 the end 316, from which the reaction bracket member 320 is formed, is shown. In FIG. 9, the strap member 312 is shown having two opposed curvilinear cuts 321 extending into the strap 312 from the edges of the strap to form tab members 323. The end 316 is then folded twice flat back over itself in the manner shown in FIGS. 10 and 12 to form a triple layer of material, a double layer of which includes the tab members 323. The triple layer of material is then subjected to an expansion and piercing operation which forms the dome 336 and creates the reaction opening 332. The surface area of the dome 336 surrounding the opening 332 is symmetrically oriented to be substantially perpendicular to the axial centerline formed by the reaction opening 332 and is prestressed by the expansion operation. Thus, the reaction pin (not shown) engages all three layers of the strap material formed in the dome 336 at the reaction opening 332 and the edge of the reaction opening 332 lies in a single planar orientation without distortion. Further, the integral formation of the dome 336 from the triple layer of strap material creates an anchor bracket of enhanced performance and strength characteristics and less potential for deterioration as a result of the forces applied by the reaction pin to the reaction opening 332. The tab members 323 are then clinched 340 in the same manner as described with the earlier embodiments or, if desired, welded, brazed or riveted to the strap 312.

The pierced dome reaction bracket of the present invention provides for greater latitude in positioning of the reaction pin within the reaction opening and further, provides for greater strength in retaining the reaction pin in position without premature failure of the brake band. The dome construction of this invention may be utilized with both uniband and standard transmission band construction. It is intended that variations of the embodiments disclosed herein may be incorporated with reaction or apply brackets for transmission bands without departing from the scope and content of the following claims.

We claim:

1. A transmission brake band for use in automatic transmissions wherein an apply piston and a reaction member operatively engage the brake band with a clutch drum located within the automatic transmission comprising, in combination: an elongated strap member (12) defining a generally annular interior circumference (34) and having an apply bracket (18) located at and integrally formed from one end (14) of said strap member (12) and a reaction bracket (20) located at and integrally formed from the opposed end (16) of said strap member (12); and a friction lining (24) adhered to the interior circumference (34) of said strap member (12); whereby said reaction bracket (20) has a generally domed configuration (36) formed from said strap member (12) material to define a pocket in such annular interior circumference (34), said domed configuration (36) and said pocket being closed about its periphery flush with said strap member (12), said dome (36) having a reaction opening (32) extending therethrough into said pocket to define a longitudinal axis wherein the portion off said strap material forming said domed configuration (36) immediately surrounding said reaction opening (32) extends in a generally perpendicular direction away from the longitudinal axis of said reaction opening (32).

2. The brake band (10) of claim 1, wherein the domed configuration (36) immediately surrounding the periphery of said reaction opening (32) has a circumference spaced equidistantly around said reaction opening (32).

3. The brake band (10) of claim 2, wherein the domed configuration (26) immediately surrounding the periphery of said reaction opening (32) is in a generally parallel relationship with the interior circumference (34) created by said strap member (12).

4. The brake band (110) of claim 1, wherein the domed configuration (136) immediately surrounding the periphery of said reaction opening (132) is of a generally square configuration having two sides (135) of said dome (136) generally parallel to the edges of said strap member (112) and the remaining two sides (137) of said dome (136) generally perpendicular to the edges of said strap member (112).

5. The brake band (110) of claim 4, wherein the domed configuration (136) immediately surrounding the periphery of said reaction opening (132) is in a generally parallel relationship with the interior circumference (134) created by said strap member (112).

6. The brake band of claim 1 further including a first ridge (242) extending parallel to the longitudinal axis of said strap member (212) and positioned between said domed configuration (236) and a longitudinal edge of said strap member (121) and a second ridge (242) extending parallel to the longitudinal axis of said strap member (212) and positioned between said domed configuration (236) and the opposed longitudinal edge of said strap member (212).

7. A transmission brake band for use in automatic transmissions wherein an apply piston and a reaction member operatively engage the brake band with a clutch drum located within the automatic transmission comprising, in combination: an elongated strap member (12) defining a generally annular interior engagement surface (34) and having two ends (14) (16); one end (14) of said strap member (12) being folded back upon itself to create a double thickness of said strap material at said end (14) and an apply bracket (18) formed therefrom, the opposed end (16) of said strap member (12) being folded flat back upon itself to create a completely engaged double thickness of said strap material at said opposed end (16) and a reaction bracket (20) formed therefrom; whereby said reaction bracket (20) formed from said double layer of strap material has a generally domed (36) configuration defining a pocket in said annular interior engagement surface (34), said domed configuration (36) and said pocket being closed about its periphery flush with said strap member (12), with a reaction opening (32) extending therethrough into said pocket to define a longitudinal axis, wherein the portion of said strap material forming said domed configuration (36) immediately surrounding said reaction opening (32) extends in a generally perpendicular direction away from the longitudinal axis of said reaction opening (32); and a friction lining (24) adhered to such engagement surface (34) of said strap member (12).

8. The brake band (10) of claim 7, wherein the domed configuration (36) immediately surrounding the periphery of said reaction opening (32) has a circumference spaced equidistantly around said reaction opening (32).

9. The brake band (10) of claim 8, wherein the domed configuration (36) immediately surrounding the periphery of said reaction opening (32) is in a generally parallel relationship with the interior circumference (34) created by said strap member (12).

10. The brake band (110) of claim 7, wherein the domed configuration (136) immediately surrounding the periphery of said reaction opening (132) is of a generally square configuration having two sides (135) of said dome (136) generally parallel to the edges of said strap member (112) and the remaining two sides (137) of said dome (136) generally perpendicular to the edges of said strap member (112).

11. The brake band (10) of claim 10, wherein the domed configuration (136) immediately surrounding the periphery of said reaction opening (132) is in a generally parallel relationship with the interior circumference (134) created by said strap member (112).

12. The brake band of claim 7 further including a first ridge (242) extending parallel to the longitudinal axis of said strap member (212) and positioned between said domed configuration (236) and a longitudinal edge of said strap member (212) and a second ridge (242) extending parallel to the longitudinal axis of said strap member (212) and positioned between said domed configuration (236) and the opposed longitudinal edge of said strap member (212).

13. A transmission brake band for use in automatic transmissions wherein an apply piston and a reaction member operatively engage the brake band with a clutch drum located within the automatic transmission comprising, in combination: an elongated strap member (312) defining a generally annular interior engagement surface (334) and having two ends (314) (316); one end (314) of said strap member (312) being folded back upon itself to create a double thickness of said strap material at said end (314) and an apply bracket (318) formed therefrom, the opposed end (316) of said strap member (312) being twice folded back upon itself to create a triple thickness of said strap material with tab members (323) at said opposed end (316) and a reaction bracket (320) formed therefrom; whereby said reaction bracket (320) formed from said triple layer of strap material has a generally domed (336) configuration, closed about its periphery, with a reaction opening (332) extending therethrough to define a longitudinal axis, wherein the portion of said strap material forming said domed configuration (336) immediately surrounding the periphery of said reaction opening 332 extends in a generally perpendicular direction away from the longitudinal axis of said reaction opening (332) and said tab members (323) are clinched (340) to said strap member (312); and a friction lining (324) adhered to such engagement surface (334) of said strap member (312).

14. The brake band (310) of claim 13, wherein the domed configuration (336) immediately surrounding the periphery of said reaction opening (332) has a circumference spaced equidistantly around said reaction opening (332).

15. The brake band (310) of claim 14, wherein the domed configuration (336) immediately surrounding the periphery of said reaction opening (332) is in a generally parallel relationship with the interior circumference (334) created by said strap member (312).

16. The brake band (310) of claim 13, wherein the domed configuration (336) immediately surrounding the periphery of said reaction opening (332) is of a generally square configuration having two sides (335) of said dome (336) generally parallel to the edges of said strap member (312) and the remaining two sides (337) of said dome (336) generally perpendicular to the edges of said strap member (312).

17. The brake band (310) of claim 16, wherein the domed configuration (336) immediately surrounding the periphery of said reaction opening (332) is in a generally parallel relationship with the interior circumference (334) created by said strap member (312).

18. The brake band of claim 13 further including a first ridge (342) extending parallel to the longitudinal axis of said strap member (312) and positioned between said domed configuration (336) and a longitudinal edge of said strap member (312) and a second ridge (342) extending parallel to the longitudinal axis of said strap member (312) and positioned between said domed configuration (336) and the opposed longitudinal edge of said strap member (312).

* * * * *